United States Patent
Ucar et al.

(10) Patent No.: US 12,120,180 B2
(45) Date of Patent: Oct. 15, 2024

(54) DETERMINING AN EXISTENCE OF A CHANGE IN A REGION

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Chang-Heng Wang, Cupertino, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 482 days.

(21) Appl. No.: 17/471,775

(22) Filed: Sep. 10, 2021

(65) Prior Publication Data

US 2023/0079176 A1    Mar. 16, 2023

(51) Int. Cl.
*H04L 67/12*    (2022.01)
*B60K 31/00*    (2006.01)
(Continued)

(52) U.S. Cl.
CPC .............. *H04L 67/12* (2013.01); *G01C 21/30* (2013.01); *G07C 5/008* (2013.01);
(Continued)

(58) Field of Classification Search
CPC ... H04L 67/12; H04L 67/1097; H04L 67/125; G01C 21/30; G01C 21/3804;
(Continued)

(56) References Cited

U.S. PATENT DOCUMENTS 7,702,183 B1    4/2010 Johnson et al.
9,424,468 B2 *  8/2016 Shimizu .................. G06T 7/246
(Continued)

OTHER PUBLICATIONS

Pannu et al., "Keeping Data Alive: Communication Across Vehicular Micro Clouds," 2019 IEEE 20th International Symposium on "A World of Wireless, Mobile and Multimedia Networks" (WoWMoM), vol. 1, 2019, pp. 1-9.
(Continued)

*Primary Examiner* — Donald J Wallace
*Assistant Examiner* — Jalal C Coduroglu
(74) *Attorney, Agent, or Firm* — Christopher G. Darrow; DARROW MUSTAFA PC

(57) ABSTRACT

A system for determining an existence of a change in a region can include a processor, a communications device, and a memory. The memory can store a change determination module and a communications module. The change determination module can cause the processor to: (1) determine, in response to having obtained an indication of a possible change in the region, a location of a connected car in a vicinity of the region and facts about a sensor disposed on the connected car and (2) determine a strategy to obtain data about the possible change. The strategy can be based on at least one of the location of the connected car or the facts about the sensor. The communications module can cause the processor to transmit, via the communications device and to the connected car, an instruction to control, according to the strategy, the sensor to obtain the data.

20 Claims, 7 Drawing Sheets

(51) Int. Cl.
*G01C 21/30* (2006.01)
*G07C 5/00* (2006.01)
*G08G 1/0967* (2006.01)
*H04L 67/1097* (2022.01)

(52) U.S. Cl.
CPC . *G08G 1/096708* (2013.01); *G08G 1/096791* (2013.01); *H04L 67/1097* (2013.01); *B60K 31/00* (2013.01)

(58) Field of Classification Search
CPC ............. G07C 5/008; G08G 1/096708; G08G 1/096791; G08G 1/0112; G08G 1/0129; G08G 1/0133; G08G 1/0141; G08G 1/09626; G08G 1/096716; G08G 1/096741; G08G 1/096775; B60K 31/00
See application file for complete search history.

(56) References Cited

U.S. PATENT DOCUMENTS

| | | | |
|---|---|---|---|
| 9,430,923 B2* | 8/2016 | Kniffen | G06T 7/248 |
| 10,883,837 B2 | 1/2021 | Minowa et al. | |
| 2006/0093187 A1* | 5/2006 | Mittal | G06T 7/254 |
| | | | 382/103 |
| 2016/0066155 A1* | 3/2016 | Fan | G06F 3/0484 |
| | | | 455/457 |
| 2018/0188037 A1 | 7/2018 | Wheeler et al. | |
| 2019/0164009 A1 | 5/2019 | Gubbi Lakshminarasimha et al. | |
| 2019/0191265 A1* | 6/2019 | Altintas | H04L 43/0876 |
| 2019/0316919 A1* | 10/2019 | Keshavamurthy | G08G 1/096844 |
| 2020/0257298 A1* | 8/2020 | Ucar | H04W 4/021 |
| 2020/0319715 A1* | 10/2020 | Holz | G06F 3/0304 |
| 2020/0385116 A1* | 12/2020 | Sabripour | B64C 39/024 |
| 2021/0272462 A1* | 9/2021 | Yang | G05D 1/0289 |
| 2022/0046468 A1* | 2/2022 | Altintas | H04L 67/108 |
| 2022/0063655 A1* | 3/2022 | Clasen | B60W 30/143 |
| 2022/0070634 A1* | 3/2022 | Ucar | H04W 4/44 |
| 2022/0198196 A1* | 6/2022 | Beaurepaire | G06F 16/29 |

OTHER PUBLICATIONS

Pannen et al., "How to Keep HD Maps for Automated Driving Up To Date," 2020 IEEE International Conference on Robotics and Automation (ICRA), Aug. 2020, pp. 2288-2294.

Kim et al., "Updating Point Cloud Layer of High Definition (HD) Map Based on Crowd Sourcing of Multiple Vehicles Installed LiDAR," IEEE Access, vol. 9, 2021, pp. 8028-8046.

Hagenauer et al., "Vehicular Micro Cloud in Action: On Gateway Selection and Gateway Handovers," Ad Hoc Networks, vol. 78, 2018, pp. 73-83.

Heo et al., "HD Map Change Detection with Cross-Domain Metric Learning," 2020 IEEE/RSJ International Conference on Intelligent Robots and Systems (IROS), 2020, pp. 10218-10224.

Higuchi et al., "How to Keep a Vehicular Micro Cloud Intact," 2018 IEEE 87th Vehicular Technology Conference (VTC Spring), 2018, pp. 1-5.

Unknown, "Connected car," last accessed on Jun. 27, 2021, 13 pages, found at https://en.wikipedia.org/wikiConnected_car#Categories_of_applications.

Ucar et al., "Chain of Interdependent Vehicular Micro Clouds," 2021 IEEE 93rd Vehicular Technology Conference (VTC2021-Spring), 2021, pp. 1-5.

* cited by examiner

FIG. 4B

416 — From FIG. 4A → Transmit, to the Connected Car, an Instruction to Control, According to the Strategy, a Motion of the Connected Car 418 — From FIG. 4A → Transmit, to the Connected Car, an Instruction to Cause the Connected Car to Become a Member of a Micro Cloud 420 — Transmit, to a Server Associated With a Stationary Micro Cloud, an Instruction to Cause the Server to: Receive the Data From the Micro Cloud, Determine the Existence of the Change, and Transmit Information to the System 422 — Transmit, to the Server Associated With the Stationary Micro Cloud, an Instruction to Cause the Server to: Determine Members of the Micro Cloud, Receive the Data From the Micro Cloud, Determine the Existence of the Change, and Transmit the Information to the System → To FIG. 4C

400

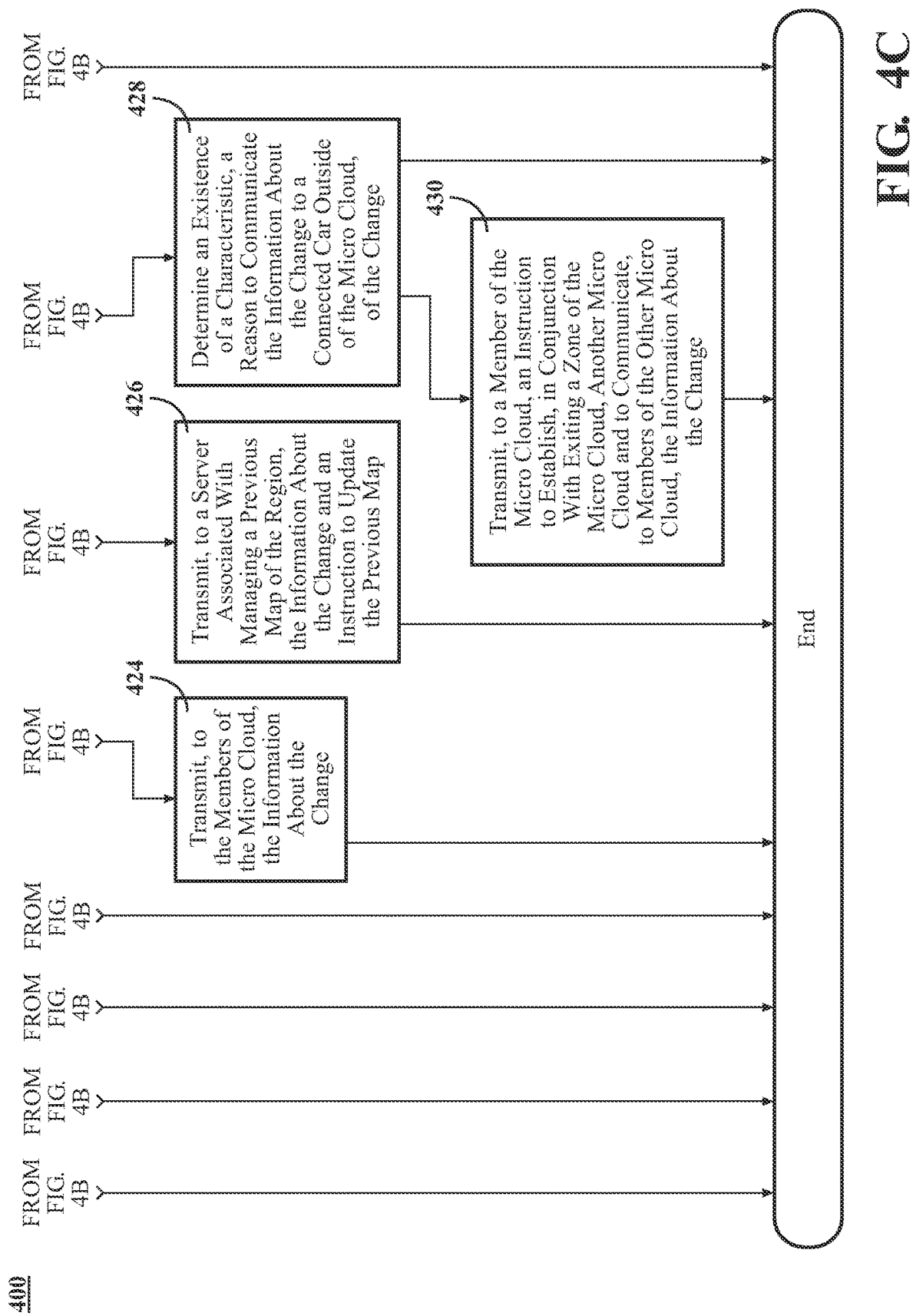

DETERMINING AN EXISTENCE OF A CHANGE IN A REGION

TECHNICAL FIELD

The disclosed technologies are directed to determining an existence of a change in a region.

BACKGROUND

A digital map can be an electronic representation of a conventional paper road map. If information for a digital map is communicated from a server via the World Wide Web, then the digital map can be referred to as a web map. An automotive navigation system can use information received from a digital map and information received from a global navigation satellite system (GNNS) to produce a turn-by-turn navigation service. A turn-by-turn navigation service can provide a route between an origination point and a destination point. A position of a vehicle determined by a turn-by-turn navigation service can be within a meter of an actual position.

A high definition map can be a digital map that includes additional information to improve the degree of accuracy to be within a decimeter of the actual position. Such a degree of accuracy can be required, for example, to support operations of a vehicle in an automated mode. A high definition map can be characterized as having layers of additional information. Each layer of additional information can be associated with a specific category of additional information. Information about relatively static aspects in a region can be included, for example, in a base map layer, a geometric map layer, and a semantic map layer. Information about relatively dynamic aspects in the region can be included, for example, in a map priors layer and a real-time knowledge layer.

The base map layer can include the information received from the digital map and the information received from the global navigation satellite system (GNNS) that produced the turn-by-turn navigation service.

The geometric map layer can be produced, using a simultaneous localization and mapping (SLAM) algorithm, by combining position information with one or more three dimensional images. The position information can be received from one or more of a global navigation satellite system (GNNS), an inertial measurement unit (IMU), or the like. The one or more three dimensional images can be one or more of images of point cloud information (e.g., produced by a lidar device), images of pixel information from one or more images (e.g., produced by one or more image sensors or cameras), or the like. The geometric map layer can include a ground map, of drivable surfaces, and voxelized geometric maps of three dimensional objects in the region.

The semantic map layer can include information about semantic objects included in the region. Semantic objects can include, for example, lane boundaries, intersections, crosswalks, parking spots, stop signs, traffic lights, or the like. The semantic map layer can include bounding boxes around the semantic objects.

SUMMARY

In an embodiment, a system for determining an existence of a change in a region can include a processor, a communications device, and a memory. The memory can store a change determination module and a communications module. The change determination module can include instructions that when executed by the processor cause the processor to: (1) determine, in response to having obtained an indication of a possible change in the region, a location of a connected car in a vicinity of the region and facts about a sensor disposed on the connected car and (2) determine a strategy to obtain data about the possible change. The strategy can be based on at least one of the location or the facts. The communications module can include instructions that when executed by the processor cause the processor to transmit, via the communications device and to the connected car, an instruction to control, according to the strategy, the sensor to obtain the data.

In another embodiment, a method for determining an existence of a change in a region can include determining, by a processor and in response to having obtained an indication of a possible change in the region, a location of a connected car in a vicinity of the region and facts about a sensor disposed on the connected car. The method can also include determining, by the processor, a strategy to obtain data about the possible change. The strategy can be based on at least one of the location or the facts. The method can also include transmitting, by the processor, via a communications device, and to the connected car, an instruction to control, according to the strategy, the sensor to obtain the data.

In another embodiment, a non-transitory computer-readable medium for determining an existence of a change in a region can include instructions that when executed by one or more processors cause the one or more processors to determine, in response to having obtained an indication of a possible change in a region, a location of a connected car in a vicinity of the region and facts about a sensor disposed on the connected car. The non-transitory computer-readable medium can also include instructions that when executed by the one or more processors cause the one or more processors to determine a strategy to obtain data about the possible change. The strategy can be based on at least one of the location or the facts. The non-transitory computer-readable medium can also include instructions that when executed by the one or more processors cause the one or more processors to transmit, via a communications device, and to the connected car, an instruction to control, according to the strategy, the sensor to obtain the data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 4A-4C are a flow diagram that illustrates an example of a method that is associated with determining an existence of a change in a region, according to the disclosed technologies.

DETAILED DESCRIPTION

Figure 1:
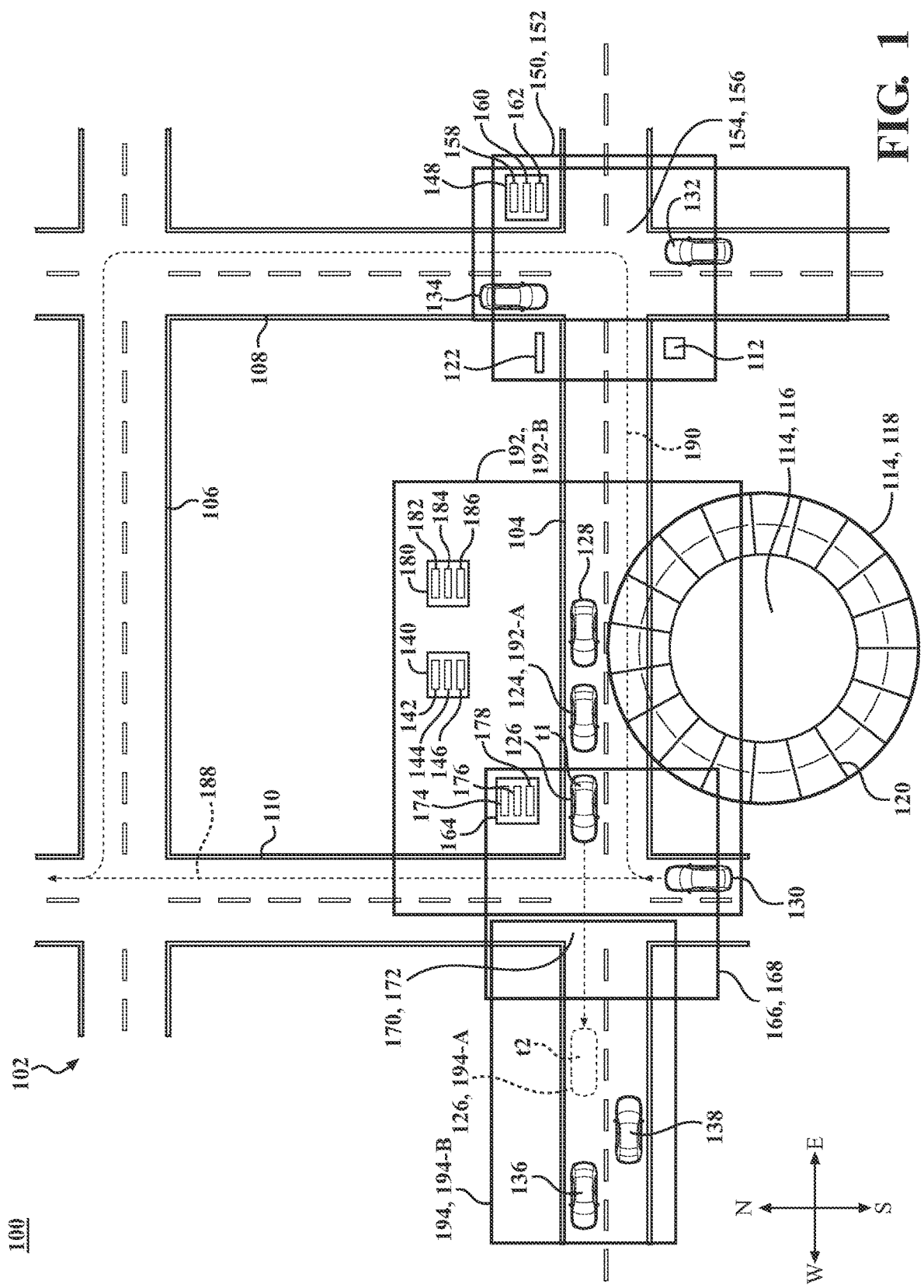
FIG. 1 includes a diagram that illustrates an example of an environment for determining an existence of a change in a region, according to the disclosed technologies.

Although the information included, for example, in a base map layer of a high definition map of a region, a geometric map layer of the high definition map, and a semantic map layer of the high definition map can be characterized as relatively static, objects in the region, for which such information is obtained, can change. Accordingly, efforts can be taken to observe a possible change in the region, to obtain data about the possible change, to determine an existence of an actual change in the region, and to update a map of the region to incorporate the change. Such efforts can include, for example, a comparison of one or more current images of the region with one or more past images of the region. For example, such images can be obtained by one or more vehicles that routinely traverse the region.

Unfortunately, because conditions (e.g., lighting, weather, etc.) at a time at which the one or more current images of the region were obtained can be different from conditions at a time at which the one or more past images of the region were obtained, sometimes a determination of the existence of the actual change in the region can be erroneous. For example, sometimes a determination can be that a change has occurred in the region when, in reality, no such change has occurred; other times a determination can be that no change has occurred in the region when, in reality, a change has occurred; and in still other times information about a change that has occurred in the region can be inaccurate.

Furthermore, often there can be a relatively long period of time between the time at which the one or more past images of the region were obtained and the time at which the one or more current images of the region were obtained so that, for a change that occurs within this relatively long period, a relatively large duration of time can exist between a time at which the change occurred and a time at which the map of the region was updated to incorporate the change. A map that does not incorporate a change that exists in a region can be of diminished efficacy in supporting operations of a vehicle.

"Connected car" technologies can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

The disclosed technologies are directed to determining an existence of a change in a region. In response to having obtained an indication of a possible change in the region: (1) a location of a connected car in a vicinity of the region and (2) facts about a sensor disposed on the connected car can be determined. For example, the sensor can include one or more of at least one image sensor or at least one ranging sensor. For example, the facts about the sensor can include one or more of a type of the sensor, a location of the sensor on the connected car, a facing direction of the sensor, or the like. A strategy can be determined to obtain data about the possible change. The strategy can be based on one or more of the location of the connected car or the facts about the sensor. For example, the strategy can be based on one or more of the location of the connected car with respect to a location of the possible change, the type of the sensor, the location of the sensor on the connected car, the facing direction of the sensor, a location of another connected car with respect to the location of the possible change, a type of another sensor disposed on the other connected car, a location of the other sensor on the other connected car, a facing direction of the other sensor, the location of the connected car with respect to the location of the other connected car, or the like. An instruction to control, according to the strategy, the sensor to obtain the data can be transmitted, via a communications device, to the connected car.

Additionally, for example, an instruction to control, according to the strategy, a motion of the connected car can be transmitted, via the communications device, to the connected car. For example, the instruction to control the motion of the connected car can include one or more of an instruction to control a speed of the connected car, an instruction to control a route to be traversed by the connected car, or the like.

Additionally, for example, in response to a determination, based on a result of a comparison of the data about the possible change with a previous map of the region, of an existence of the change in the region: (1) information about the change in the region and (2) an instruction to cause a server associated with managing a previous map of the region to update the previous map to incorporate the change can be transmitted to the server associated with managing the previous map of the region.

FIG. 1 includes a diagram that illustrates an example of an environment 100 for determining an existence of a change in a region, according to the disclosed technologies. For example, the environment 100 can include a region 102 of *Agaricus*, a town associated with a production of mushrooms. The region 102 can include, for example, Portobello Street 104 (disposed along a line of latitude), Shiitake Street 106 (disposed along a line of latitude, north of Portobello Street 104), First Street 108 (disposed along a line of longitude), and Second Street 110 (disposed along a line of longitude, west of First Street 108). For example, the region 102 can include, at a southwest corner of Portobello Street 104 and First Street 108, a traffic light 112. The traffic light 112 can be for eastbound traffic on Portobello Street 104. For example, *Agaricus* can be in a process of building, south of Portobello Street 104, between First Street 108 and Second Street 110, a new civic center 114. The civic center 114 can be intended to have a shape of a mushroom with: (1) a "stem" 116, having a cylindrical shape, and (2) a "cap" 118 having a substantially hemispherical shape. A bottom portion of the "cap" 118 can be intended to be 20 feet above the ground. The bottom portion of the "cap" 118 can be intended to be cantilevered so that a portion of the "cap" 118 will hang over Portobello Street 104. Scaffolding 120, used to support construction of the "cap" 118, can block part of an eastbound lane of Portobello Street 104. In conjunction with the building of the new civic center 114, *Agaricus* can also be in a process of installing, at a northwest corner of Portobello Street 104 and First Street 108, a sign 122 that states "Civic Center" and includes an arrow that points to the right. The sign 122 can be intended to be for southbound traffic on First Street 108.

For example, the environment 100 can include a first vehicle 124. The first vehicle 124 can be in a westbound lane of Portobello Street 104, between First Street 108 and Second Street 110.

For example, the environment 100 can include a second vehicle 126. The second vehicle 126 can be: (1) at a first time $t_1$, in the westbound lane of Portobello Street 104, between First Street 108 and Second Street 110, and in front of the first vehicle 124 and (2) at a second time $t_2$, in the westbound lane of Portobello Street 104, west of Second Street 110.

For example, the environment 100 can include a third vehicle 128. The third vehicle 128 can be in the westbound lane of Portobello Street 104, between First Street 108 and Second Street 110, and behind the first vehicle 124.

For example, the environment 100 can include a fourth vehicle 130. The fourth vehicle 130 can be in a northbound lane of Second Street 110, at a southeast corner of Portobello Street 104 and Second Street 110.

For example, the environment 100 can include a fifth vehicle 132. The fifth vehicle 132 can be in a northbound lane of First Street 108, at a southeast corner of Portobello Street 104 and First Street 108.

For example, the environment 100 can include a sixth vehicle 134. The sixth vehicle 134 can be in a southbound lane of First Street 108, near a northwest corner of Portobello Street 104 and First Street 108.

For example, the environment 100 can include a seventh vehicle 136. The seventh vehicle 136 can be in the westbound lane of Portobello Street 104, west of Second Street 110, and, at the second time $t_2$, in front of the second vehicle 126.

For example, the environment 100 can include an eighth vehicle 138. The eighth vehicle 138 can be in an eastbound lane of Portobello Street 104, west of Second Street 110, and, at the second time $t_2$, near to the second vehicle 126.

For example, the environment 100 can include a server 140 associated with managing a map of the region 102. For example, the server 140 can include a processor 142, a memory 144, and a communications device 146.

For example, the environment 100 can include a server 148 associated with a first stationary micro cloud 150. A micro cloud can be characterized by a distribution, among members of the micro cloud, of one or more of one or more computing resources or one or more data storage resources in order to collaborate on executing operations. The members can include at least connected cars. The first stationary micro cloud 150 can be characterized by an area 152 at a first geographical location 154. The first geographic location 154 can be an intersection 156 of Portobello Street 104 and First Street 108. For example, the server 148 can include a processor 158, a memory 160, and a communications device 162.

For example, the environment 100 can include a server 164 associated with a second stationary micro cloud 166. The second stationary micro cloud 166 can be characterized by an area 168 at a second geographical location 170. The second geographic location 170 can be an intersection 172 of Portobello Street 104 and Second Street 110. For example, the server 164 can include a processor 174, a memory 176, and a communications device 178.

For example, the environment 100 can include a system 180 for determining an existence of a change in the region 102. For example, the system 180 can include a processor 182, a memory 184, and a communications device 186.

Figure 2:
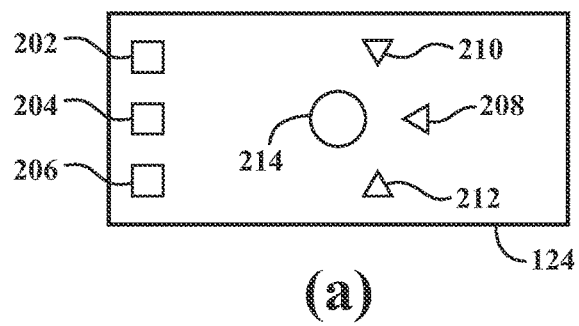
FIG. 2 includes diagrams that illustrate components included in vehicles included in the environment, according to the disclosed technologies.
Figure 2:
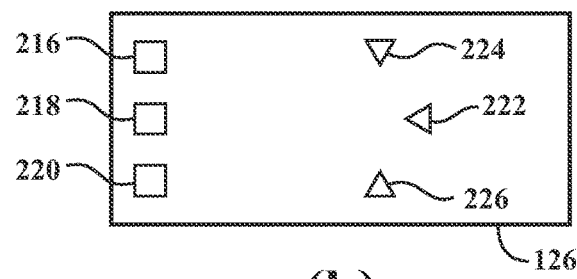
Figure 2:
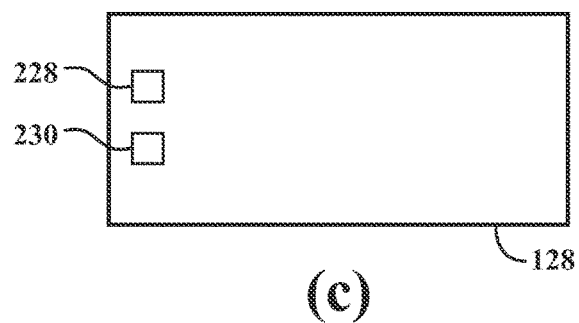
Figure 2:
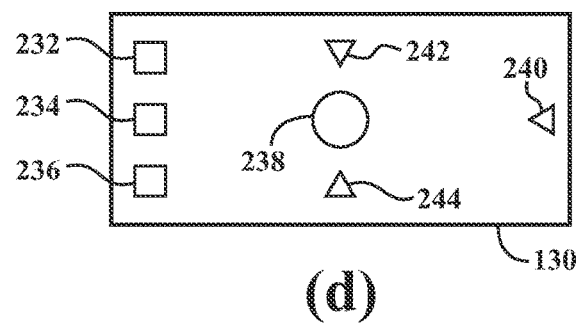
Figure 2:
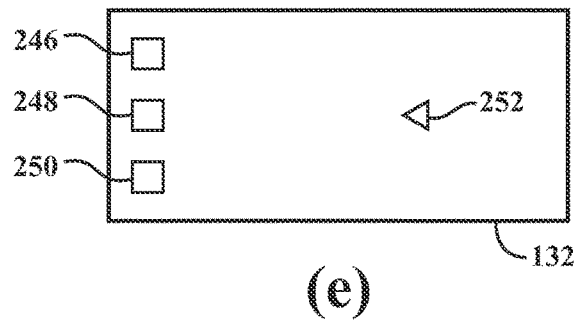
Figure 2:
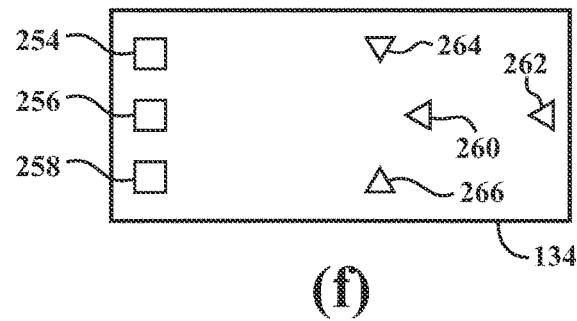
Figure 2:
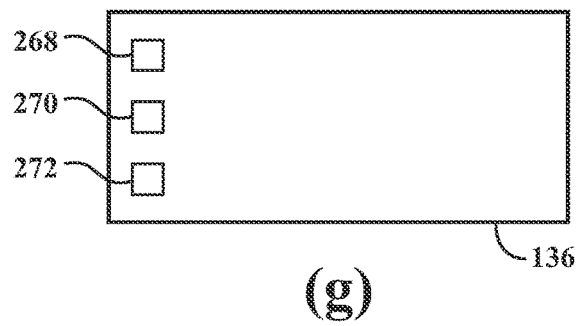
Figure 2:
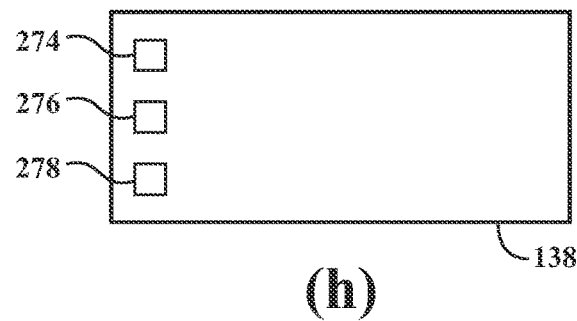

FIG. 2 includes diagrams that illustrate components included in vehicles included in the environment 100, according to the disclosed technologies.

In a view (a) of FIG. 2, the first vehicle 124 can include, for example, a processor 202, a memory 204, a communications device 206, a radar device 208, a leftward facing camera 210, a rightward facing camera 212, and a lidar device 214. For example, the first vehicle 124 can be a connected car.

In a view (b) of FIG. 2, the second vehicle 126 can include, for example, a processor 216, a memory 218, a communications device 220, a forward facing camera 222, a leftward facing camera 224, and a rightward facing camera 226. For example, the second vehicle 126 can be a connected car.

In a view (c) of FIG. 2, the third vehicle 128 can include, for example, a processor 228 and a memory 230. For example, the third vehicle 128 cannot be a connected car.

In a view (d) of FIG. 2, the fourth vehicle 130 can include, for example, a processor 232, a memory 234, a communications device 236, a lidar device 238, a forward facing infrared ranging device 240, a leftward facing ultrasonic ranging device 242, and a rightward facing ultrasonic ranging device 244. For example, the fourth vehicle 130 can be a connected car.

In a view (e) of FIG. 2, the fifth vehicle 132 can include, for example, a processor 246, a memory 248, a communications device 250, and a forward facing camera 252. For example, the fifth vehicle 132 can be a connected car.

In a view (f) of FIG. 2, the sixth vehicle 134 can include, for example, a processor 254, a memory 256, a communications device 258, a forward facing camera 260, a forward facing infrared imaging sensor 262, a leftward facing ultrasonic imaging sensor 264, and a rightward facing ultrasonic imaging sensor 266. For example, the sixth vehicle 134 can be a connected car.

In a view (g) of FIG. 2, the seventh vehicle 136 can include, for example, a processor 268, a memory 270, and a communications device 272. For example, the seventh vehicle 136 can be a connected car.

In a view (h) of FIG. 2, the eighth vehicle 138 can include, for example, a processor 274, a memory 276, and a communications device 278. For example, the eighth vehicle 138 can be a connected car.

Figure 3:
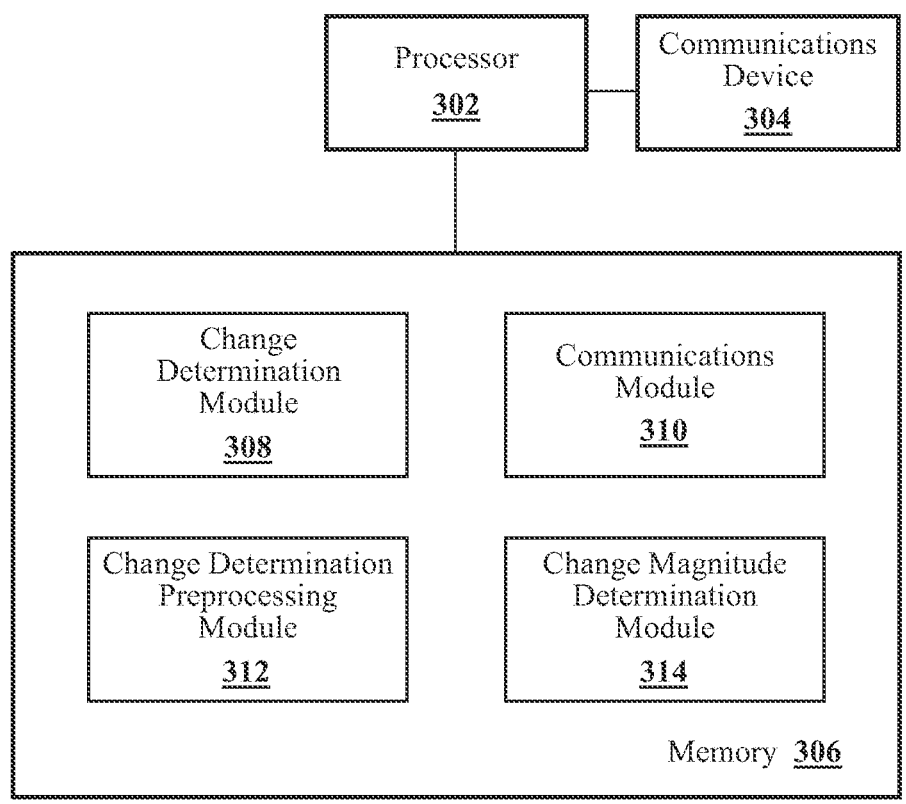
FIG. 3 includes a block diagram that illustrates an example of a system for determining an existence of a change in a region, according to the disclosed technologies.

FIG. 3 includes a block diagram that illustrates an example of a system 300 for determining an existence of a change in a region, according to the disclosed technologies. The system 300 can include, for example, a processor 302, a communications device 304, and a memory 306. The communications device 304 can be communicably coupled to the processor 302. The memory 306 can be communicably coupled to the processor 302. The memory 306 can store, for example, a change determination module 308 and a communications module 310. With reference to FIGS. 1 and 3, for example, the system 300 can be the system 180, the processor 302, can be the processor 182, the communications device 304 can be the communications device 186, and the memory 306 can be the memory 184.

Returning to FIG. 3, for example, the change determination module 308 can include instructions that function to control the processor 302 to determine, in response to having obtained an indication of a possible change in the region, a location of a connected car in a vicinity of the region and facts about a sensor disposed on the connected car. For example, the instruction to determine the location of the connected car in the vicinity of the region and the facts about the sensor disposed on the connected car can include instructions to determine, in response to having obtained information that the indication of the possible change in the region is greater than or equal to a threshold measure of change, the location of the connected car in the vicinity of the region and the facts about the sensor disposed on the connected car.

With reference to FIGS. 1 and 2, in a first example, in response to having obtained an indication that a portion of the eastbound lane of Portobello Street 104, between First Street 108 and Second Street 110, is being or will be blocked: (1) the location can be determined for one or more of the first vehicle 124, the second vehicle 126, or the fourth vehicle 130 and (2) facts can be determined about: (a) one or more of the radar device 208, the leftward facing camera 210, the rightward facing camera 212, or the lidar device 214, (b) one or more of the forward facing camera 222, the leftward facing camera 224, or the rightward facing camera 226, or (c) one or more of the lidar device 238, the forward facing infrared ranging device 240, the leftward facing ultrasonic ranging device 242, or the rightward facing ultrasonic ranging device 244. (Note that, although the third vehicle 128 is in the vicinity of the portion of the eastbound lane of Portobello Street 104, between First Street 108 and Second Street 110, that is being or will be blocked, because the third vehicle 128 is not a connected car, the location may not be determined for the third vehicle 128.)

In a second example, in response to having obtained an indication that something (i.e., the sign 122) is being or will be installed at the northwest corner of Portobello Street 104 and First Street 108: (1) the location can be determined for one or more of the fifth vehicle 132 or the sixth vehicle 134 and (2) facts can be determined about: (a) the forward facing camera 252 or (b) the forward facing camera 260, the forward facing infrared imaging sensor 262, the leftward facing ultrasonic imaging sensor 264, or the rightward facing ultrasonic imaging sensor 266.

Returning to FIG. 3, in a configuration, for example, the communications module 310 can include instructions that function to control the processor 302 to receive, via the communications device 304, the indication of the possible change in the region. For example, the indication of the possible change in the region can include a message about the possible change in the region. With reference to FIG. 1, for example, an individual (e.g., a construction engineer) associated with the process of building the new civic center 114 can cause a message, with information about the process, to be transmitted to the system 180.

Returning to FIG. 3, in this configuration, additionally or alternatively, for example, the communications module 310 can include instructions that function to control the processor 302 to receive, via the communications device 304, one or more current images of the region. The memory 306 can further store a change determination preprocessing module 312. The change determination preprocessing module 312 can include instructions that function to control the processor 302 to: (1) compare the one or more current images of the region with one or more past images of the region and (2) determine, based on a result of a comparison of the one or more current images of the region with the one or more past images of the region, the indication of the possible change in the region. For example, a determination of an existence of the indication of the possible change in the region can be based on a count of a number of the one or more current images of the region including information indicative of the existence of the indication of the possible change in the region being greater than a threshold count.

With reference to FIG. 1, in the first example, one or more current images of the portion of the eastbound lane of Portobello Street 104, between First Street 108 and Second Street 110, that is being or will be blocked can be received from one or more of the first vehicle 124 or the second vehicle 126. In the second example, one or more current images of the thing (i.e., the sign 122) that is being or will be installed at the northwest corner of Portobello Street 104 and First Street 108 can be received from the sixth vehicle 134. For example, a determination of an existence of the indication of the possible change in the region 102 can be based on a count of a number of the one or more current images of the region 102 including information indicative of the existence of the indication of the possible change in the region 102 being greater than a threshold count.

For example, the sensor can include one or more of one or more image sensors or one or more ranging sensors. For example, one or more of the one or more image sensors can include one or more cameras, one or more ultrasonic imaging sensors, one or more infrared imaging sensors, or the like. For example, one or more of the one or more ranging sensors can include one or more of one or more lidar devices, one or more radar devices, one or more ultrasonic ranging devices, one or more infrared ranging devices, or the like. For example, the one or more cameras can include one or more of one or more color cameras, one or more stereoscopic cameras, one or more video cameras, one or more digital video cameras, or the like.

For example, the facts about the sensor can include one or more of: (1) a type of the sensor (e.g., an image sensor, a ranging sensor, etc.), (2) a location of the sensor on the connected car, (3) a facing direction of the sensor, or (4) the like.

Returning to FIG. 3, for example, the change determination module 308 can include instructions that function to control the processor 302 to determine, a strategy to obtain data about the possible change. For example, the strategy can be based on at least one of the location of the connected car or the facts about the sensor.

For example, the instructions to determine the strategy to obtain the data about the possible change can include instructions to determine the strategy based on one or more of: (1) the location of the connected car with respect to a location of the possible change, (2) the type of the sensor, (3) the location of the sensor on the connected car, (4) the facing direction of the sensor, (5) a location of another connected car with respect to the location of the possible change, (6) a type of another sensor disposed on the other connected car, (7) a location of the other sensor on the other connected car, (8) a facing direction of the other sensor, (9) the location of the connected car with respect to the location of the other connected car, or (10) the like.

With reference to FIGS. 1 and 2, in the first example, the instructions to determine the strategy to obtain the data about the possible change can determine that because: (1) of an unusual three-dimensional shape of objects (i.e., the scaffolding 120) associated with the portion of the eastbound lane of Portobello Street 104, between First Street 108 and Second Street 110, that is being or will be blocked, data obtained from a ranging sensor may be preferable to data obtained from an image sensor, (2) both the first vehicle 124 and the fourth vehicle 130 include a ranging sensor (i.e., on the first vehicle 124: the radar device 208 and the lidar device 214; and on the fourth vehicle 130: the lidar device 238, the forward facing infrared ranging device 240, the leftward facing ultrasonic ranging device 242, and the rightward facing ultrasonic ranging device 244), (3) both the first vehicle 124 and the fourth vehicle 130 are in a vicinity of each other and of the portion of the eastbound lane of Portobello Street 104, between First Street 108 and Second Street 110, that is being or will be blocked, and (4) each of the lidar device 214 and the lidar device 238 has a facing direction of 360 degrees, the strategy to obtain the data about the possible change can be to obtain the data from the lidar device 214 on the first vehicle 124 and from the lidar device 238 on the fourth vehicle 130.

In the second example, the instructions to determine the strategy to obtain the data about the possible change can determine that because: (1) data obtained from an image sensor will be sufficient for the thing (i.e., the sign 122) that is being or will be installed at the northwest corner of Portobello Street 104 and First Street 108, (2) both the fifth vehicle 132 and the sixth vehicle 134 include an image sensor (i.e., on the fifth vehicle 132: the forward facing camera 252; and on the sixth vehicle 134: the forward facing camera 260), (3) both the fifth vehicle 132 and the sixth vehicle 134 are in a vicinity of each other and of the thing (i.e., the sign 122) that is being or will be installed at the northwest corner of Portobello Street 104 and First Street 108, and (4) each of the forward facing camera 252 and the forward facing camera 260 has a facing direction that supports obtaining the data about the thing (i.e., the sign 122) that is being or will be installed at the northwest corner of Portobello Street 104 and First Street 108, the strategy to obtain the data about the possible change can be to obtain the data from the forward facing camera 252 on the fifth vehicle 132 and from the forward facing camera 260 on the sixth vehicle 134.

Returning to FIG. 3, for example, the communications module 310 can include instructions that function to control the processor 302 to transmit, via the communications device 304 and to the connected car, an instruction to control, according to the strategy, the sensor to obtain the data.

For example, the instruction to control the sensor to obtain the data about the possible change can include one or more of: (1) an instruction to control an angle of a facing direction of the sensor with respect to one or more of an axis along a length of the connected car or an axis along a width of the connected car, (2) an instruction to control a quality of a representation of the data, (3) an instruction to control a degree of magnification associated with the representation of the data, or (4) the like.

With reference to FIGS. 1 and 2, in the second example, the instruction to control the sensor to obtain the data about the possible change can include one or more of: (1) an instruction to control the angle of the facing direction of the forward facing camera 260 on the sixth vehicle 134 to be directed toward the thing (i.e., the sign 122) that is being or will be installed at the northwest corner of Portobello Street 104 and First Street 108, (2) an instruction to control the quality of the representation of the data so that markings on the sign 122 can be determined to include alphanumeric characters, and (3) an instruction to control the degree of magnification associated with the representation of the data so that the alphanumeric characters (i.e., "Civic Center") can be read in the representation of the data.

Returning to FIG. 3, in a configuration, for example, the communications module 310 can further include instructions that function to control the processor 302 to transmit, via the communications device 304 and to the connected car, an instruction to control, according to the strategy, a motion of the connected car.

For example, the instruction to control the motion of the connected car can include one or more of: (1) an instruction to control a speed of the connected car, (2) an instruction to control a route to be traversed by the connected car, or (3) the like.

With reference to FIG. 1, in the first example, the instruction to control, according to the strategy, the motion of the connected car can include an instruction to cause the fourth vehicle 130 to change from a planned trajectory 188 (north on Second Street 110 continuing beyond Shiitake Street 106) to a new trajectory 190 (east on Portobello Street 104, north on First Street 108, west on Shiitake Street 106, and north on Second Street 110). The new trajectory 190 can cause the fourth vehicle 130 to traverse in the vicinity of the portion of the eastbound lane of Portobello Street 104, between First Street 108 and Second Street 110, that is being or will be blocked. Additionally, in the first example, the instruction to control, according to the strategy, the motion of the connected car can include an instruction to cause the fourth vehicle 130 to move, near the portion of the eastbound lane of Portobello Street 104, between First Street 108 and Second Street 110, that is being or will be blocked, at a relatively slow speed.

Returning to FIG. 3, in a configuration, for example, the communications module 310 can further include instructions that function to control the processor 302 to transmit, via the communications device 304 and to the connected car, an instruction to cause the connected car to become a member of a micro cloud. The micro cloud can be configured to collaborate on executing the strategy to obtain the data about the possible change. The micro cloud can be characterized by a distribution, among members of the micro cloud, of one or more of one or more computing resources or one or more data storage resources. The members can include at least connected cars.

For example, the micro cloud can be a mobile micro cloud. The mobile micro cloud can be characterized by a zone centered on a leader of the mobile micro cloud. The leader can determine, among one or more other connected cars in the zone, one or more candidates to become one or more other members of the mobile micro cloud. Members of the mobile micro cloud can include the leader and the one or more other members. The leader can distribute, to the one or more other members, a task associated with executing the strategy to obtain the data about the possible change. At least one of the members of the mobile micro cloud can transmit, to a server associated with a stationary micro cloud, the data about the possible change.

For example, the communications module 310 can further include instructions that function to control the processor 302 to transmit, via the communications device 304 and to the server associated with the stationary micro cloud, an instruction to cause the server associated with the stationary micro cloud to: (1) receive, from the at least one of the members of the mobile micro cloud, the data about the possible change, (2) retrieve, from a storage device, a previous map of the region, (3) compare the data about the possible change with the previous map of the region, (4) determine, based on a result of a comparison of the data about the possible change with the previous map of the region, the existence of the change in the region, and (5) transmit, to the system 300 and based on a determination of the existence of the change in the region, information about the change in the region.

With reference to FIG. 1, in the first example, the instruction to cause the connected car to become a member of a micro cloud can be transmitted from the system 180 to the first vehicle 124. For example, the micro cloud can be a mobile micro cloud 192. For example, the first vehicle 124 can be the leader 192-A of the mobile micro cloud 192. The mobile micro cloud 192 can be characterized by a zone 192-B centered on the leader 192-A of the mobile micro cloud 192. The leader 192-A can determine, among the one or more other connected cars in the zone 192-B (e.g., the second vehicle 126 and the fourth vehicle 130), the one or more candidates to become the one or more other members of the mobile micro cloud 192. (Note that, although the third vehicle 128 is in the zone 192-B, because the third vehicle 128 is not a connected car, the third vehicle 128 may not be determined to be a candidate to become a member of the mobile micro cloud 192.) The members of the mobile micro cloud 192 can include the leader 192-A and the one or more other members (e.g., the second vehicle 126 and the fourth vehicle 130). At least one of the members of the mobile micro cloud 192 can transmit, to the server 164 associated with the second stationary micro cloud 166, the data about the possible change.

For example, the server 164 associated with the second stationary micro cloud 166 can: (1) receive, from the one or more of the members of the mobile micro cloud 192, the data about the possible change, (2) retrieve, from a storage device, the previous map of the region 102, (3) compare the data about the possible change with the previous map of the region 102, (4) determine, based on the result of the comparison of the data about the possible change with the previous map of the region 102, the existence of the change in the region 102, and (5) transmit, to the system 180 and based on the determination of the existence of the change in the region 102, the information about the change in the region 102.

Returning to FIG. 3, in this configuration, additionally or alternatively, for example, the micro cloud can be a stationary micro cloud. The stationary micro cloud can be characterized by an area at a geographical location. A server can be associated with the stationary micro cloud. The communications module 310 can further includes instructions that function to control the processor 302 to transmit, via the communications device 304 and to the server associated with the stationary micro cloud, an instruction to cause the server to: (1) determine, among one or more other connected cars in the area, one or more candidates to become one or more members of the stationary micro cloud, (2) distribute, to the one or more members, a task associated with executing the strategy to obtain the data about the possible change, (3) receive, from the one or more members, the data about the possible change, (4) retrieve, from a storage device, a previous map of the region, (5) compare the data about the possible change with the previous map of the region, (6) determine, based on a result of a comparison of the data about the possible change with the previous map of the region, the existence of the change in the region, and (7) transmit, to the system 300 and based on a determination of the existence of the change in the region, information about the change in the region.

With reference to FIG. 1, in the second example, the instruction to cause the connected car to become a member of a micro cloud can be transmitted from the system 180 to the fifth vehicle 132. For example, the micro cloud can be the first stationary micro cloud 150. The first stationary micro cloud 150 can be characterized by the area 152 at the first geographical location 154. The server 148 can be associated with the first stationary micro cloud 150. The server 148 can: (1) determine among the one or more other connected cars in the area 152 (e.g., the fifth vehicle 132 and the sixth vehicle 134), the one or more candidates to become the one or more members of the first stationary micro cloud 150, (2) receive, from the one or more of the members of the first stationary micro cloud 150, the data about the possible change, (3) retrieve, from a storage device, the previous map of the region 102, (4) compare the data about the possible change with the previous map of the region 102, (5) determine, based on the result of the comparison of the data about the possible change with the previous map of the region 102, the existence of the change in the region 102, and (6) transmit, to the system 180 and based on the determination of the existence of the change in the region 102, the information about the change in the region 102.

Returning to FIG. 3, for example, the storage device that stores the previous map of the region can include one or more of a cloud server, an edge server, or a connected car that stores a copy of the previous map of the region.

In a configuration, for example, the communications module 310 can further include instructions that function to control the processor 302 to transmit, via the communications device 304 and to the one or more of the members of the micro cloud, the information about the change in the region. With reference to FIG. 1, in the first example, the system 180 can transmit, to the one or more other members of the mobile micro cloud 192, the information about the change in the region 102. In the second example, the system 180 can transmit, to the one or more other members of the first stationary micro cloud 150, the information about the change in the region 102.

Returning to FIG. 3, in a configuration, for example, the communications module 310 can further include instructions that function to control the processor 302 to transmit, via the communications device 304 and to a server associated with managing the previous map of the region: (1) the information about the change in the region and (2) an instruction to cause the server associated with managing the previous map of the region to update the previous map of the region to incorporate the change in the region. For example, updating the previous map of the region to incorporate the change in the region in accordance with the disclosed technologies can supplement other conventional efforts to update the previous map of the region. With reference to FIG. 1, for example, the system 180 can transmit to the server 140: (1) the information about the change in the region 102 and (2) the instruction to cause the server 140 to update the previous map of the region 102 to incorporate the change in the region 102.

Returning to FIG. 3, in a configuration, for example, the memory 306 can further store a change magnitude determination module 314. The change magnitude determination module 314 can include instructions that function to control the processor 302 to determine an existence of a characteristic of the change in the region. The characteristic can be a reason to communicate the information about the change in the region to a connected car outside of the micro cloud.

With reference to FIG. 1, for example, the system 180 can determine the existence of a characteristic of the change in the region 102 in which the characteristic can be a reason to communicate the information about the change in the region 102 to a connected car outside of the micro cloud (e.g., the mobile micro cloud 192 or the first stationary micro cloud 150). For example, the system 180 can determine that the existence of the characteristic of having the portion of the eastbound lane of Portobello Street 104, between First Street 108 and Second Street 110, being blocked or to be blocked may be a reason to communicate the information about the change in the region 102 to a connected car outside of the micro cloud (e.g., the mobile micro cloud 192 or the first stationary micro cloud 150). For example, the system 180 can determine that the existence of the characteristic of having the thing (i.e., the sign 122) being installed or to be installed at the northwest corner of Portobello Street 104 and First Street 108 may not be a reason to communicate the information about the change in the region 102 to a connected car outside of the micro cloud (e.g., the mobile micro cloud 192 or the first stationary micro cloud 150).

Returning to FIG. 3, in this configuration, additionally, for example, the communications module 310 can further include instructions that function to control the processor 302 to transmit, via the communications device 304 and to the one or more of the members of the micro cloud, an instruction to cause the one or more of the members of the mobile micro cloud to: (1) establish, in conjunction with exiting the zone, another mobile micro cloud as a leader of the other mobile micro cloud and (2) communicate, to one or more other members of the other mobile micro cloud, the information about the change in the region. The other mobile micro cloud can be characterized by another zone centered on the leader of the other mobile micro cloud. The leader of the other mobile micro cloud can determine, among one or more other connected cars in the other zone, one or more candidates to become one or more other members of the other mobile micro cloud. The one or more candidates can be a connected car expected to use the information about the change in the region.

With reference to FIG. 1, in the first example, the instruction to establish, in conjunction with exiting the zone 192-B, another mobile micro cloud can be transmitted from the system 180 to the second vehicle 126. For example, the second vehicle 126 can be: (1) at the first time $t_1$, in the westbound lane of Portobello Street 104, between First Street 108 and Second Street 110, and in front of the first vehicle 124 and (2) at the second time $t_2$, in the westbound lane of Portobello Street 104, west of Second Street 110, behind the seventh vehicle 136. For example, the other mobile micro cloud can be a mobile micro cloud 194. For example, the second vehicle 126 can be the leader 194-A of the mobile micro cloud 194. The mobile micro cloud 194 can be characterized by a zone 194-B centered on the leader 194-A of the mobile micro cloud 194. The leader 194 can determine, among the one or more other connected cars in the zone 194-B (e.g., the seventh vehicle 136 and the eighth vehicle 138), the one or more candidates to become the one or more other members of the mobile micro cloud 194. The one or more candidates can be a connected car expected to use the information about the change in the region 102. For example, the leader 194-A can determine that, because the eighth vehicle 138 is in the eastbound lane of Portobello Street 104, the eighth vehicle 138 may be expected to use the information about the change in the region 102. Accordingly, the leader 194-A can determine that the eighth vehicle 138 can be a candidate to become a member of the mobile micro cloud 194. For example, the leader 194-A can determine that, because the seventh vehicle 136 is in the westbound lane of Portobello Street 104, the seventh vehicle 136 may not be expected to use the information about the change in the region 102. Accordingly, the leader 194-A can determine that the seventh vehicle 136 may not be a candidate to become a member of the mobile micro cloud 194. For example, the second vehicle 126 (i.e., the leader 194-A) can communicate, to the eighth vehicle 138, the information about the change in the region 102.

Figure 4A:
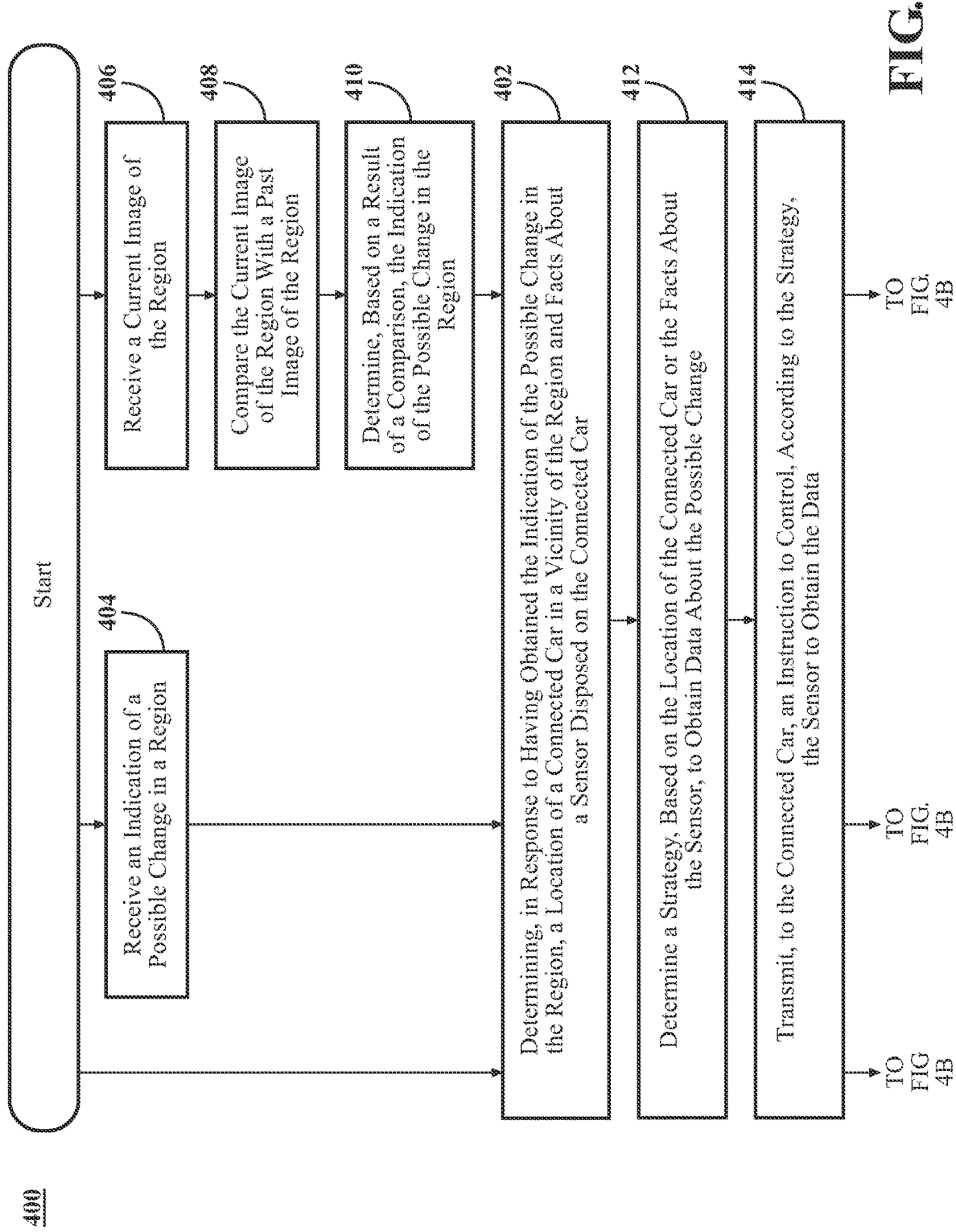

FIGS. 4A-4C are a flow diagram that illustrates an example of a method 400 that is associated with determining an existence of a change in a region, according to the disclosed technologies. Although the method 400 is described in combination with the system 300 illustrated in FIG. 3, one of skill in the art understands, in light of the description herein, that the method 400 is not limited to being implemented by the system 300 illustrated in FIG. 3. Rather, the system 300 illustrated in FIG. 3 is an example of a system that may be used to implement the method 400. Additionally, although the method 400 is illustrated as a generally serial process, various aspects of the method 400 may be able to be executed in parallel.

In FIG. 4A, in the method 400, at an operation 402, for example, the change determination module 308 can determine, in response to having obtained an indication of a possible change in the region, a location of a connected car in a vicinity of the region and facts about a sensor disposed on the connected car. For example, the change determination module 308 can determine, in response to having obtained information that the indication of the possible change in the region is greater than or equal to a threshold measure of change, the location of the connected car in the vicinity of the region and the facts about the sensor disposed on the connected car.

In a configuration, at an operation 404, for example, the communications module 310 can receive, via the communications device 304, the indication of the possible change in the region. For example, the indication of the possible change in the region can include a message about the possible change in the region.

In this configuration, additionally or alternatively, at an operation 406, for example, the communications module 310 can receive, via the communications device 304, one or more current images of the region. At an operation 408, for example, the change determination preprocessing module 312 can compare the one or more current images of the region with one or more past images of the region. At an operation 410, for example, the change determination preprocessing module 312 can determine, based on a result of a comparison of the one or more current images of the region with the one or more past images of the region, the indication of the possible change in the region. For example, a determination of an existence of the indication of the possible change in the region can be based on a count of a number of the one or more current images of the region including information indicative of the existence of the indication of the possible change in the region being greater than a threshold count.

For example, the sensor can include one or more of one or more image sensors or one or more ranging sensors. For example, one or more of the one or more image sensors can include one or more cameras, one or more ultrasonic imaging sensors, one or more infrared imaging sensors, or the like. For example, one or more of the one or more ranging sensors can include one or more of one or more lidar devices, one or more radar devices, one or more ultrasonic ranging devices, one or more infrared ranging devices, or the like. For example, the one or more cameras can include one or more of one or more color cameras, one or more stereoscopic cameras, one or more video cameras, one or more digital video cameras, or the like.

For example, the facts about the sensor can include one or more of: (1) a type of the sensor (e.g., an image sensor, a ranging sensor, etc.), (2) a location of the sensor on the connected car, (3) a facing direction of the sensor, or (4) the like.

At an operation 412, for example, the change determination module 308 can determine, a strategy to obtain data about the possible change. For example, the strategy can be based on at least one of the location of the connected car or the facts about the sensor.

For example, a determination of the strategy to obtain the data about the possible change can be based on one or more of: (1) the location of the connected car with respect to a location of the possible change, (2) the type of the sensor, (3) the location of the sensor on the connected car, (4) the facing direction of the sensor, (5) a location of another connected car with respect to the location of the possible change, (6) a type of another sensor disposed on the other connected car, (7) a location of the other sensor on the other connected car, (8) a facing direction of the other sensor, (9) the location of the connected car with respect to the location of the other connected car, or (10) the like.

At an operation 414, for example, the communications module 310 can transmit, via the communications device 304 and to the connected car, an instruction to control, according to the strategy, the sensor to obtain the data.

For example, the instruction to control the sensor to obtain the data about the possible change can include one or more of: (1) an instruction to control an angle of a facing direction of the sensor with respect to one or more of an axis along a length of the connected car or an axis along a width of the connected car, (2) an instruction to control a quality of a representation of the data, (3) an instruction to control a degree of magnification associated with the representation of the data, or (4) the like.

Additionally, in FIG. 4B, in the method 400, at an operation 416, for example, the communications module 310 can transmit, via the communications device 304 and to the connected car, an instruction to control, according to the strategy, a motion of the connected car.

For example, the instruction to control the motion of the connected car can include one or more of: (1) an instruction to control a speed of the connected car, (2) an instruction to control a route to be traversed by the connected car, or (3) the like.

In a configuration, at an operation 418, for example, the communications module 310 can transmit, via the communications device 304 and to the connected car, an instruction to cause the connected car to become a member of a micro cloud. The micro cloud can be configured to collaborate on executing the strategy to obtain the data about the possible change. The micro cloud can be characterized by a distribution, among members of the micro cloud, of one or more of one or more computing resources or one or more data storage resources. The members can include at least connected cars.

For example, the micro cloud can be a mobile micro cloud. The mobile micro cloud can be characterized by a zone centered on a leader of the mobile micro cloud. The leader can determine, among one or more other connected cars in the zone, one or more candidates to become one or more other members of the mobile micro cloud. Members of the mobile micro cloud can include the leader and the one or more other members. The leader can distribute, to the one or more other members, a task associated with executing the strategy to obtain the data about the possible change. At least one of the members of the mobile micro cloud can transmit, to a server associated with a stationary micro cloud, the data about the possible change.

Additionally, at an operation 420, for example, the communications module 310 can transmit, via the communications device 304 and to the server associated with the stationary micro cloud, an instruction to cause the server associated with the stationary micro cloud to: (1) receive, from the at least one of the members of the mobile micro cloud, the data about the possible change, (2) retrieve, from a storage device, a previous map of the region, (3) compare the data about the possible change with the previous map of the region, (4) determine, based on a result of a comparison of the data about the possible change with the previous map of the region, the existence of the change in the region, and (5) transmit, to the system 300 and based on a determination of the existence of the change in the region, information about the change in the region.

In this configuration, additionally or alternatively, for example, the micro cloud can be a stationary micro cloud. The stationary micro cloud can be characterized by an area at a geographical location. A server can be associated with the stationary micro cloud. At an operation 422, for example, the communications module 310 can transmit, via the communications device 304 and to the server associated with the stationary micro cloud, an instruction to cause the server to: (1) determine, among one or more other connected cars in the area, one or more candidates to become one or more members of the stationary micro cloud, (2) distribute, to the one or more members, a task associated with executing the strategy to obtain the data about the possible change, (3) receive, from the one or more members, the data about the possible change, (4) retrieve, from a storage device, a previous map of the region, (5) compare the data about the possible change with the previous map of the region, (6) determine, based on a result of a comparison of the data about the possible change with the previous map of the region, the existence of the change in the region, and (7) transmit, to the system 300 and based on a determination of the existence of the change in the region, information about the change in the region.

For example, the storage device that stores the previous map of the region can include one or more of a cloud server, an edge server, or a connected car that stores a copy of the previous map of the region.

In a configuration, in FIG. 4C, in the method 400, at an operation 424, for example, the communications module 310 can transmit, via the communications device 304 and to the one or more of the members of the micro cloud, the information about the change in the region.

In a configuration, at an operation 426, for example, the communications module 310 can transmit, via the communications device 304 and to a server associated with managing the previous map of the region: (1) the information about the change in the region and (2) an instruction to cause the server associated with managing the previous map of the region to update the previous map of the region to incorporate the change in the region. For example, updating the previous map of the region to incorporate the change in the region in accordance with the disclosed technologies can supplement other conventional efforts to update the previous map of the region.

In a configuration, at an operation 428, for example, the change magnitude determination module 314 can determine an existence of a characteristic of the change in the region. The characteristic can be a reason to communicate the information about the change in the region to a connected car outside of the micro cloud.

In this configuration, additionally, at an operation 430, for example, the communications module 310 can transmit, via the communications device 304 and to the one or more of the members of the micro cloud, an instruction to cause the one or more of the members of the mobile micro cloud to: (1) establish, in conjunction with exiting the zone, another mobile micro cloud as a leader of the other mobile micro cloud and (2) communicate, to one or more other members of the other mobile micro cloud, the information about the change in the region. The other mobile micro cloud can be characterized by another zone centered on the leader of the other mobile micro cloud. The leader of the other mobile micro cloud can determine, among one or more other connected cars in the other zone, one or more candidates to become one or more other members of the other mobile micro cloud. The one or more candidates can be a connected car expected to use the information about the change in the region.

Figure 5:
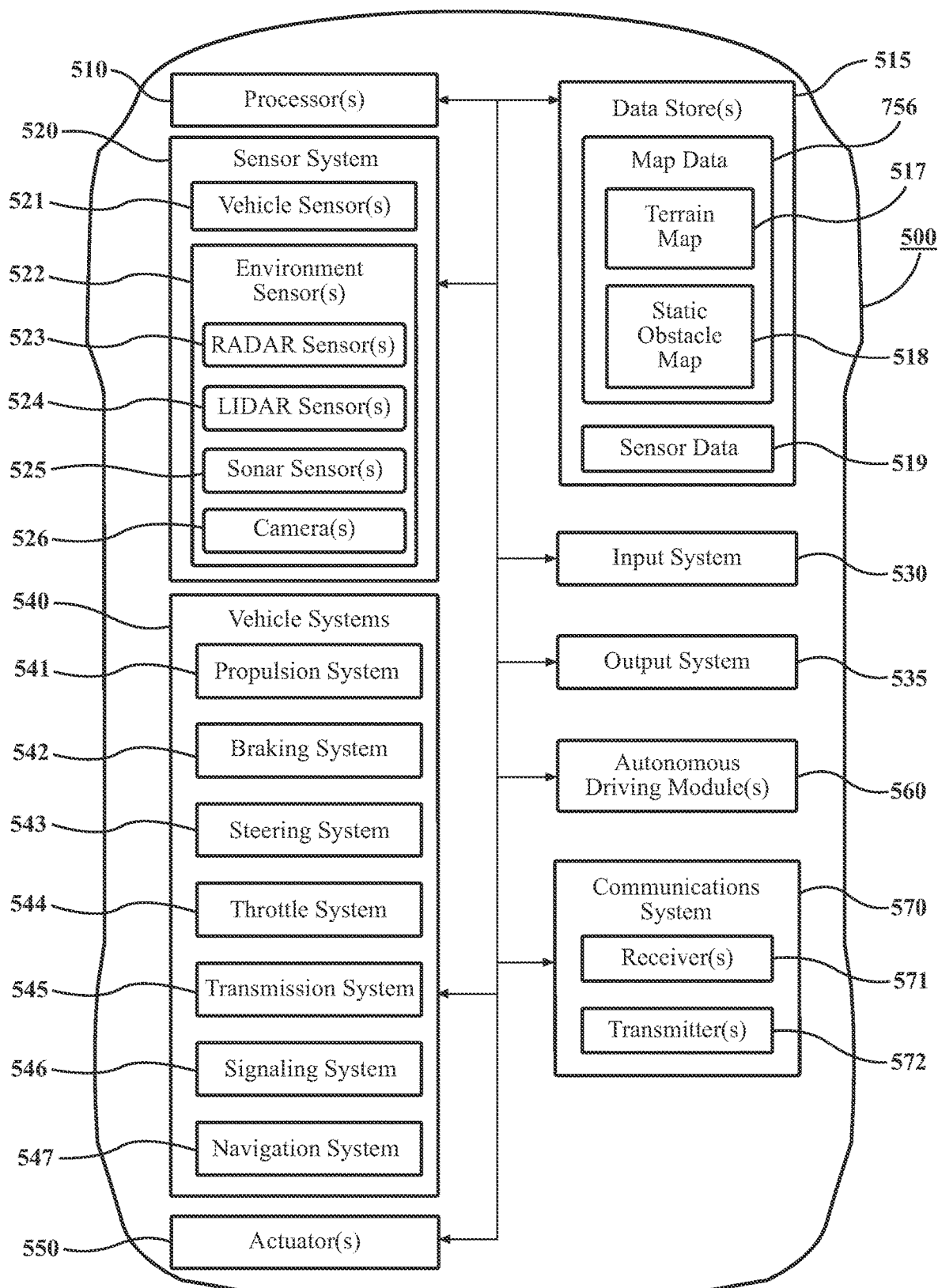
FIG. 5 includes a block diagram that illustrates an example of elements disposed on a vehicle, according to the disclosed technologies.

FIG. 5 includes a block diagram that illustrates an example of elements disposed on a vehicle 500, according to the disclosed technologies. As used herein, a "vehicle" can be any form of powered transport. In one or more implementations, the vehicle 500 can be an automobile. While arrangements described herein are with respect to automobiles, one of skill in the art understands, in light of the description herein, that embodiments are not limited to automobiles.

In some embodiments, the vehicle 500 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 500 is performed according to inputs received from a user (e.g., human driver). In one or more arrangements, the vehicle 500 can be a conventional vehicle that is configured to operate in only a manual mode.

In one or more embodiments, the vehicle 500 can be an automated vehicle. As used herein, "automated vehicle" can refer to a vehicle that operates in an automated mode. As used herein, "automated mode" can refer to navigating and/or maneuvering the vehicle 500 along a travel route using one or more computing systems to control the vehicle 500 with minimal or no input from a human driver. In one or more embodiments, the vehicle 500 can be highly automated or completely automated. In one embodiment, the vehicle 500 can be configured with one or more semi-automated operational modes in which one or more computing systems perform a portion of the navigation and/or maneuvering of the vehicle along a travel route, and a vehicle operator (i.e., driver) provides inputs to the vehicle 500 to perform a portion of the navigation and/or maneuvering of the vehicle 500 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 500 can include various elements. The vehicle 500 can have any combination of the various elements illustrated in FIG. 5. In various embodiments, it may not be necessary for the vehicle 500 to include all of the elements illustrated in FIG. 5. Furthermore, the vehicle 500 can have elements in addition to those illustrated in FIG. 5. While the various elements are illustrated in FIG. 5 as being located within the vehicle 500, one or more of these elements can be located external to the vehicle 500. Furthermore, the elements illustrated may be physically separated by large distances. For example, as described, one or more components of the disclosed system can be implemented within the vehicle 500 while other components of the system can be implemented within a cloud-computing environment, as described below. For example, the elements can include one or more processors 510, one or more data stores 515, a sensor system 520, an input system 530, an output system 535, vehicle systems 540, one or more actuators 550, one or more automated driving modules 560, a communications system 570.

In one or more arrangements, the one or more processors 510 can be a main processor of the vehicle 500. For example, the one or more processors 510 can be an electronic control unit (ECU). For example, functions and/or operations of any of the processor 202, the processor 216, the processor 228, the processor 232, the processor 246, the processor 254, the processor 268, or the processor 274 (illustrated in FIG. 2) can be realized by the one or more processors 510.

The one or more data stores 515 can store, for example, one or more types of data. For example, functions and/or operations of the memory 204, the memory 218, the memory 230, the memory 234, the memory 248, the memory 256, the memory 270, or the memory 276 (illustrated in FIG. 2) can be realized by the one or more data stores 515. The one or more data stores 515 can include volatile memory and/or non-volatile memory. Examples of suitable memory for the one or more data stores 515 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 515 can be a component of the one or more processors 510. Additionally or alternatively, the one or more data stores 515 can be operatively connected to the one or more processors 510 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 515 can store map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry. The map data 516 can be high quality and/or highly detailed.

In one or more arrangements, the map data 516 can include one or more terrain maps 517. The one or more terrain maps 517 can include information about the ground, terrain, roads, surfaces, and/or other features of one or more geographic areas. The one or more terrain maps 517 can include elevation data of the one or more geographic areas. The map data 516 can be high quality and/or highly detailed. The one or more terrain maps 517 can define one or more ground surfaces, which can include paved roads, unpaved roads, land, and other things that define a ground surface.

In one or more arrangements, the map data 516 can include one or more static obstacle maps 518. The one or more static obstacle maps 518 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 518 can have location data, size data, dimension data, material data, and/or other data associated with them. The one or more static obstacle maps 518 can include measurements, dimensions, distances, and/or information for one or more static obstacles. The one or more static obstacle maps 518 can be high quality and/or highly detailed. The one or more static obstacle maps 518 can be updated to reflect changes within a mapped area.

In one or more arrangements, the one or more data stores 515 can store sensor data 519. As used herein, "sensor data" can refer to any information about the sensors with which the vehicle 500 can be equipped including the capabilities of and other information about such sensors. The sensor data 519 can relate to one or more sensors of the sensor system 520. For example, in one or more arrangements, the sensor data 519 can include information about one or more lidar sensors 524 of the sensor system 520.

In some arrangements, at least a portion of the map data 516 and/or the sensor data 519 can be located in one or more data stores 515 that are located onboard the vehicle 500. Alternatively or additionally, at least a portion of the map data 516 and/or the sensor data 519 can be located in one or more data stores 515 that are located remotely from the vehicle 500.

The sensor system 520 can include one or more sensors. As used herein, a "sensor" can refer to any device, component, and/or system that can detect and/or sense something.

The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 520 includes a plurality of sensors, the sensors can work independently from each other. Alternatively, two or more of the sensors can work in combination with each other. In such a case, the two or more sensors can form a sensor network. The sensor system 520 and/or the one or more sensors can be operatively connected to the one or more processors 510, the one or more data stores 515, and/or another element of the vehicle 500 (including any of the elements illustrated in FIG. 5). The sensor system 520 can acquire data of at least a portion of the external environment of the vehicle 500 (e.g., nearby vehicles). The sensor system 520 can include any suitable type of sensor. Various examples of different types of sensors are described herein. However, one of skill in the art understands that the embodiments are not limited to the particular sensors described herein.

The sensor system 520 can include one or more vehicle sensors 521. The one or more vehicle sensors 521 can detect, determine, and/or sense information about the vehicle 500 itself. In one or more arrangements, the one or more vehicle sensors 521 can be configured to detect and/or sense position and orientation changes of the vehicle 500 such as, for example, based on inertial acceleration. In one or more arrangements, the one or more vehicle sensors 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. The one or more vehicle sensors 521 can be configured to detect and/or sense one or more characteristics of the vehicle 500. In one or more arrangements, the one or more vehicle sensors 521 can include a speedometer to determine a current speed of the vehicle 500.

Alternatively or additionally, the sensor system 520 can include one or more environment sensors 522 configured to acquire and/or sense driving environment data. As used herein, "driving environment data" can include data or information about the external environment in which a vehicle is located or one or more portions thereof. For example, the one or more environment sensors 522 can be configured to detect, quantify, and/or sense obstacles in at least a portion of the external environment of the vehicle 500 and/or information/data about such obstacles. Such obstacles may be stationary objects and/or dynamic objects. The one or more environment sensors 522 can be configured to detect, measure, quantify, and/or sense other things in the external environment of the vehicle 500 such as, for example, lane markers, signs, traffic lights, traffic signs, lane lines, crosswalks, curbs proximate the vehicle 500, off-road objects, etc.

Various examples of sensors of the sensor system 520 are described herein. The example sensors may be part of the one or more vehicle sensors 521 and/or the one or more environment sensors 522. However, one of skill in the art understands that the embodiments are not limited to the particular sensors described.

In one or more arrangements, the one or more environment sensors 522 can include one or more radar sensors 523, one or more lidar sensors 524, one or more sonar sensors 525, and/or one more cameras 526. In one or more arrangements, the one or more cameras 526 can be one or more high dynamic range (HDR) cameras or one or more infrared (IR) cameras. For example, the one or more cameras 526 can be used to record a reality of a state of an item of information that can appear in the digital map. For example, functions and/or operations of the radar device 208 (illustrated in FIG. 2) can be realized by the one or more radar sensors 523. For example, functions and/or operations of any of the lidar device 214 or the lidar device 238 (illustrated in FIG. 2) can be realized by the one or more lidar sensors 524. For example, functions and/or operations of any of the leftward facing ultrasonic ranging device 242, the rightward facing ultrasonic ranging device 244, the leftward facing ultrasonic imaging sensor 264, or the rightward facing ultrasonic imaging sensor 266 (illustrated in FIG. 2) can be realized by the more sonar sensors 525. For example, functions and/or operations of any of the leftward facing camera 210, the rightward facing camera 212, the forward facing camera 222, the leftward facing camera 224, the rightward facing camera 226, the forward facing infrared ranging device 240, the forward facing camera 252, the forward facing camera 260, the forward facing infrared imaging sensor 262 (illustrated in FIG. 2) can be realized by the one more cameras 526.

The input system 530 can include any device, component, system, element, arrangement, or groups thereof that enable information/data to be entered into a machine. The input system 530 can receive an input from a vehicle passenger (e.g., a driver or a passenger). The output system 535 can include any device, component, system, element, arrangement, or groups thereof that enable information/data to be presented to a vehicle passenger (e.g., a driver or a passenger).

Various examples of the one or more vehicle systems 540 are illustrated in FIG. 5. However, one of skill in the art understands that the vehicle 500 can include more, fewer, or different vehicle systems. Although particular vehicle systems can be separately defined, each or any of the systems or portions thereof may be otherwise combined or segregated via hardware and/or software within the vehicle 500. For example, the one or more vehicle systems 540 can include a propulsion system 541, a braking system 542, a steering system 543, a throttle system 544, a transmission system 545, a signaling system 546, and/or the navigation system 547. Each of these systems can include one or more devices, components, and/or a combination thereof, now known or later developed.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system, a geolocation system, and/or a combination thereof.

The one or more actuators 550 can be any element or combination of elements operable to modify, adjust, and/or alter one or more of the vehicle systems 540 or components thereof responsive to receiving signals or other inputs from the one or more processors 510 and/or the one or more automated driving modules 560. Any suitable actuator can be used. For example, the one or more actuators 550 can include motors, pneumatic actuators, hydraulic pistons, relays, solenoids, and/or piezoelectric actuators.

The one or more processors 510 and/or the one or more automated driving modules 560 can be operatively connected to communicate with the various vehicle systems 540 and/or individual components thereof. For example, the one or more processors 510 and/or the one or more automated driving modules 560 can be in communication to send and/or receive information from the various vehicle systems 540 to control the movement, speed, maneuvering, heading, direction, etc. of the vehicle 500. The one or more processors 510 and/or the one or more automated driving modules 560 may control some or all of these vehicle systems 540 and, thus, may be partially or fully automated.

The one or more processors 510 and/or the one or more automated driving modules 560 may be operable to control the navigation and/or maneuvering of the vehicle 500 by controlling one or more of the vehicle systems 540 and/or components thereof. For example, when operating in an automated mode, the one or more processors 510 and/or the one or more automated driving modules 560 can control the direction and/or speed of the vehicle 500. The one or more processors 510 and/or the one or more automated driving modules 560 can cause the vehicle 500 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 570 can include one or more receivers 571 and/or one or more transmitters 572. The communications system 570 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 570 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of the communications device 206, the communications device 220, the communications device 236, the communications device 250, the communications device 258, the communications device 272, the communications device 278 (illustrated in FIG. 2), or the communications device 304 (illustrated in FIG. 3) can be realized by the communications system 570.

Moreover, the one or more processors 510, the one or more data stores 515, and the communications system 570 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected cars.

The vehicle 500 can include one or more modules, at least some of which are described herein. The modules can be implemented as computer-readable program code that, when executed by the one or more processors 510, implement one or more of the various processes described herein. One or more of the modules can be a component of the one or more processors 510. Alternatively or additionally, one or more of the modules can be executed on and/or distributed among other processing systems to which the one or more processors 510 can be operatively connected. The modules can include instructions (e.g., program logic) executable by the one or more processors 510. Alternatively or additionally, the one or more data store 515 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 500 can include one or more automated driving modules 560. The one or more automated driving modules 560 can be configured to receive data from the sensor system 520 and/or any other type of system capable of capturing information relating to the vehicle 500 and/or the external environment of the vehicle 500. In one or more arrangements, the one or more automated driving modules 560 can use such data to generate one or more driving scene models. The one or more automated driving modules 560 can determine position and velocity of the vehicle 500. The one or more automated driving modules 560 can determine the location of obstacles, obstacles, or other environmental features including traffic signs, trees, shrubs, neighboring vehicles, pedestrians, etc.

The one or more automated driving modules 560 can be configured to receive and/or determine location information for obstacles within the external environment of the vehicle 500 for use by the one or more processors 510 and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The one or more automated driving modules 560 can be configured to determine one or more travel paths, current automated driving maneuvers for the vehicle 500, future automated driving maneuvers and/or modifications to current automated driving maneuvers based on data acquired by the sensor system 520, driving scene models, and/or data from any other suitable source such as determinations from the sensor data 519. As used herein, "driving maneuver" can refer to one or more actions that affect the movement of a vehicle. Examples of driving maneuvers include: accelerating, decelerating, braking, turning, moving in a lateral direction of the vehicle 500, changing travel lanes, merging into a travel lane, and/or reversing, just to name a few possibilities. The one or more automated driving modules 560 can be configured to implement determined driving maneuvers. The one or more automated driving modules 560 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 560 can be configured to execute various vehicle functions and/or to transmit data to, receive data from, interact with, and/or control the vehicle 500 or one or more systems thereof (e.g., one or more of vehicle systems 540). For example, functions and/or operations of an automotive navigation system can be realized by the one or more automated driving modules 560.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-3, 4A-4C, and 5, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
   a processor;
   a communications device; and
   a memory storing:
      a change determination module including instructions that when executed by the processor cause the processor to:
         determine, in response to having obtained an indication of a possible change in a region, a location of a connected car in a vicinity of the region and facts about a sensor disposed on the connected car, wherein the possible change is with respect to at least one of a presence of an object in the region or a location of the object; and
         determine a strategy to obtain data about the possible change, the strategy being based on at least one of the location or the facts; and
      a communications module including instructions that when executed by the processor cause the processor to transmit, via the communications device and to the connected car, an instruction to control, according to the strategy, the sensor to obtain the data.

2. The system of claim 1, wherein the instruction to determine the location of the connected car in the vicinity of the region and the facts about the sensor disposed on the connected car include instructions to determine, in response to having obtained information that the indication of the possible change in the region is greater than or equal to a threshold measure of change, the location of the connected car in the vicinity of the region and the facts about the sensor disposed on the connected car.

3. The system of claim 1, wherein the communications module further includes instructions that when executed by the processor cause the processor to receive, via the communications device, the indication of the possible change in the region.

4. The system of claim 3, wherein the indication of the possible change in the region comprises a message about the possible change in the region.

5. The system of claim 1, wherein:
   the communications module further includes instructions that when executed by the processor cause the processor to receive, via the communications device, at least one current image of the region; and
   the memory further stores a change determination preprocessing module including instructions that when executed by the processor cause the processor to:
      compare the at least one current image of the region with at least one past image of the region; and
      determine, based on a result of a comparison of the at least one current image of the region with the at least one past image of the region, the indication of the possible change in the region.

6. The system of claim 1, wherein the instruction to control the sensor to obtain the data about the possible change comprises at least one of:
- an instruction to control an angle of a facing direction of the sensor with respect to at least one of an axis along a length of the connected car or an axis along a width of the connected car,
- an instruction to control a quality of a representation of the data, or
- an instruction to control a degree of magnification associated with the representation of the data.

7. The system of claim 1, wherein the communications module further includes instructions that when executed by the processor cause the processor to transmit, via the communications device and to the connected car, an instruction to control, according to the strategy, a motion of the connected car, the instruction to control the motion of the connected car comprising at least one of:
- an instruction to control a speed of the connected car, or
- an instruction to control a route to be traversed by the connected car.

8. The system of claim 1, wherein the communications module further includes instructions that when executed by the processor cause the processor to transmit, via the communications device and to the connected car, an instruction to cause the connected car to become a member of a micro cloud, the micro cloud being configured to collaborate on executing the strategy to obtain the data about the possible change, the micro cloud being characterized by a distribution, among members of the micro cloud, of at least one of at least one computing resource or at least one data storage resource, the members including at least connected cars.

9. The system of claim 8, wherein:
- the micro cloud is a mobile micro cloud,
- the mobile micro cloud is characterized by a zone centered on a leader of the mobile micro cloud,
- the leader determines, among at least one other connected car in the zone, at least one candidate to become at least one other member of the mobile micro cloud,
- members of the mobile micro cloud comprise the leader and the at least one other member,
- the leader distributes, to the at least one other member, a task associated with executing the strategy to obtain the data about the possible change,
- at least one of the members of the mobile micro cloud transmits, to a server associated with a stationary micro cloud, the data about the possible change.

10. The system of claim 9, wherein the communications module further includes instructions that when executed by the processor cause the processor to transmit, via the communications device and to the server associated with the stationary micro cloud, an instruction to cause the server associated with the stationary micro cloud to:
- receive, from the at least one of the members of the mobile micro cloud, the data about the possible change;
- retrieve, from a storage device, a previous map of the region;
- compare the data about the possible change with the previous map of the region;
- determine, based on a result of a comparison of the data about the possible change with the previous map of the region, an existence of a change in the region; and
- transmit, to the system and based on a determination of the existence of the change in the region, information about the change in the region.

11. The system of claim 10, wherein the storage device comprises at least one of a cloud server, an edge server, or a connected car that stores a copy of the previous map of the region.

12. The system of claim 10, wherein the communications module further includes instructions that when executed by the processor cause the processor to transmit, to the at least one of the members of the mobile micro cloud, the information about the change in the region.

13. The system of claim 10, wherein the communications module further includes instructions that when executed by the processor cause the processor to transmit, via the communications device and to a server associated with managing the previous map of the region:
- the information about the change in the region; and
- an instruction to cause the server associated with managing the previous map of the region to update the previous map of the region to incorporate the change in the region.

14. The system of claim 10, wherein the memory further stores a change magnitude determination module including instructions that when executed by the processor cause the processor to determine an existence of a characteristic of the change in the region, the characteristic being a reason to communicate the information about the change in the region to a connected car outside of the mobile micro cloud.

15. The system of claim 14, wherein the communications module further includes instructions that when executed by the processor cause the processor to transmit, via the communications device and to the at least one of the members of the mobile micro cloud, an instruction to cause the at least one of the members of the mobile micro cloud to:
- establish, in conjunction with exiting the zone, another mobile micro cloud as a leader of the other mobile micro cloud, wherein:
  - the other mobile micro cloud is characterized by another zone centered on the leader of the other mobile micro cloud, and
  - the leader of the other mobile micro cloud determines, among at least one other connected car in the other zone, at least one candidate to become at least one other member of the other mobile micro cloud, the at least one candidate being a connected car expected to use the information about the change in the region; and
- communicate, to the at least one other member of the other mobile micro cloud, the information about the change in the region.

16. The system of claim 8, wherein:
the micro cloud is a stationary micro cloud,
the stationary micro cloud is characterized by an area at a geographical location,
a server is associated with the stationary micro cloud, and
the communications module further includes instructions that when executed by the processor cause the processor to transmit, via the communications device and to the server associated with the stationary micro cloud, an instruction to cause the server to:
- determine, among at least one other connected car in the area, at least one candidate to become at least one member of the stationary micro cloud,
- distribute, to the at least one member, a task associated with executing the strategy to obtain the data about the possible change,
- receive, from the at least one member, the data about the possible change;

retrieve, from a storage device, a previous map of the region;

compare the data about the possible change with the previous map of the region;

determine, based on a result of a comparison of the data about the possible change with the previous map of the region, an existence of a change in the region; and transmit, to the system and based on a determination of the existence of the change in the region, information about the change in the region.

17. A method, comprising:

determining, by a processor and in response to having obtained an indication of a possible change in a region, a location of a connected car in a vicinity of the region and facts about a sensor disposed on the connected ear; car, wherein the possible change is with respect to at least one of a presence of an object in the region or a location of the object;

determining, by the processor, a strategy to obtain data about the possible change, the strategy being based on at least one of the location or the facts; and transmitting, by the processor, via a communications device, and to the connected car, an instruction to control, according to the strategy, the sensor to obtain the data.

18. The method of claim 17, wherein:

the sensor comprises at least one of at least one image sensor or at least one ranging sensor, and the facts about the sensor comprise at least one of:
a type of the sensor,
a location of the sensor on the connected car, or
a facing direction of the sensor.

19. The method of claim 18, wherein the determining the strategy to obtain the data about the possible change comprises determining the strategy based on at least one of:
the location of the connected car with respect to a location of the possible change,
the type of the sensor,
the location of the sensor on the connected car,
the facing direction of the sensor,
a location of another connected car with respect to the location of the possible change,
a type of another sensor disposed on the other connected car,
a location of the other sensor on the other connected car,
a facing direction of the other sensor, or
the location of the connected car with respect to the location of the other connected car.

20. A non-transitory computer-readable medium for determining an existence of a change in a region, the non-transitory computer-readable medium including instructions that when executed by one or more processors cause the one or more processors to:

determine, in response to having obtained an indication of a possible change in a region, a location of a connected car in a vicinity of the region and facts about a sensor disposed on the connected car, wherein the possible change is with respect to at least one of a presence of an object in the region or a location of the object;

determine a strategy to obtain data about the possible change, the strategy being based on at least one of the location or the facts; and transmit, via a communications device, and to the connected car, an instruction to control, according to the strategy, the sensor to obtain the data.

* * * * *